INVENTORS
KARL KALIWODA
WALTER SCHURAN
HEINRICH EVERHARTZ
By: Lou and Berman
Agents

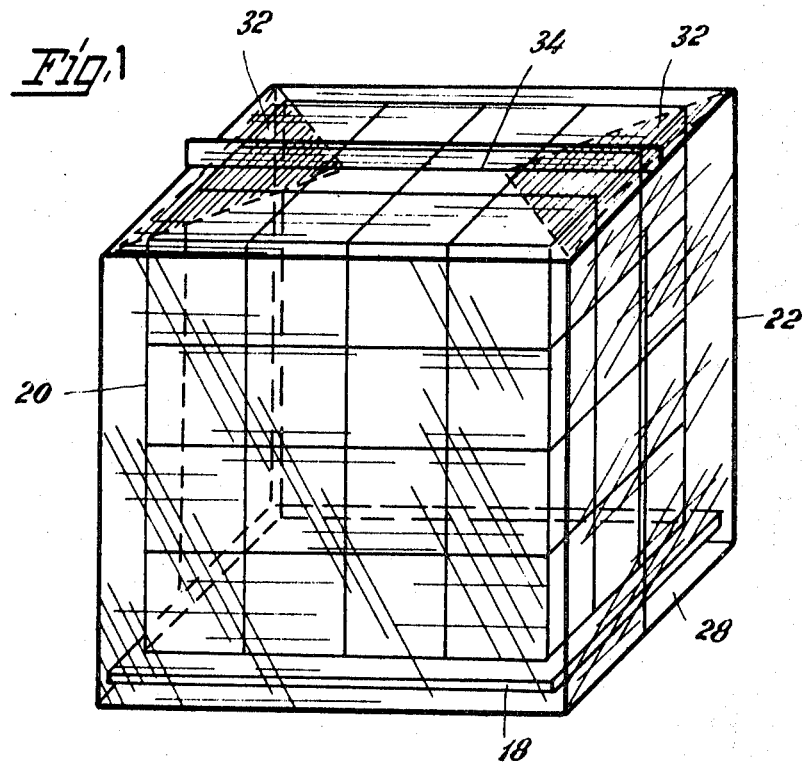
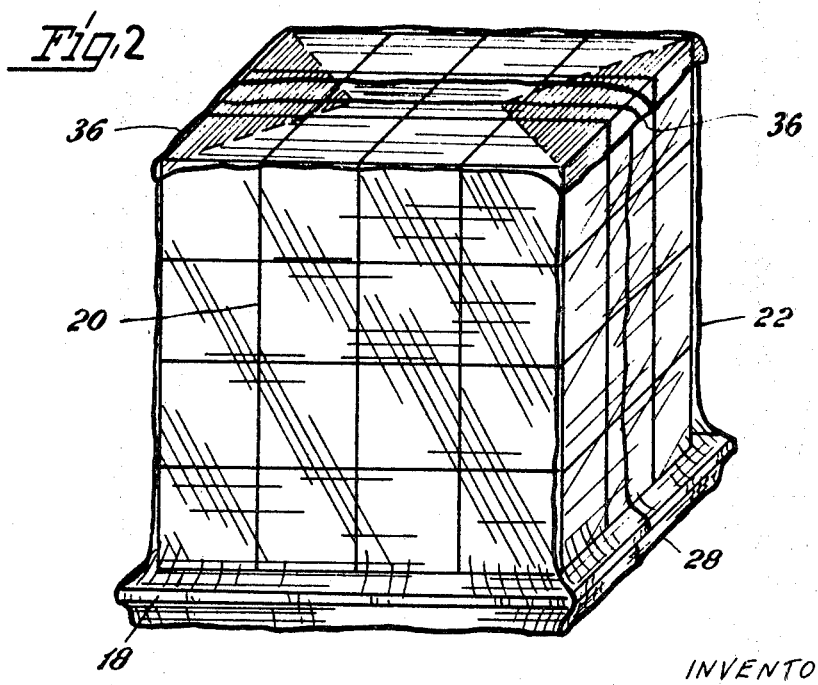

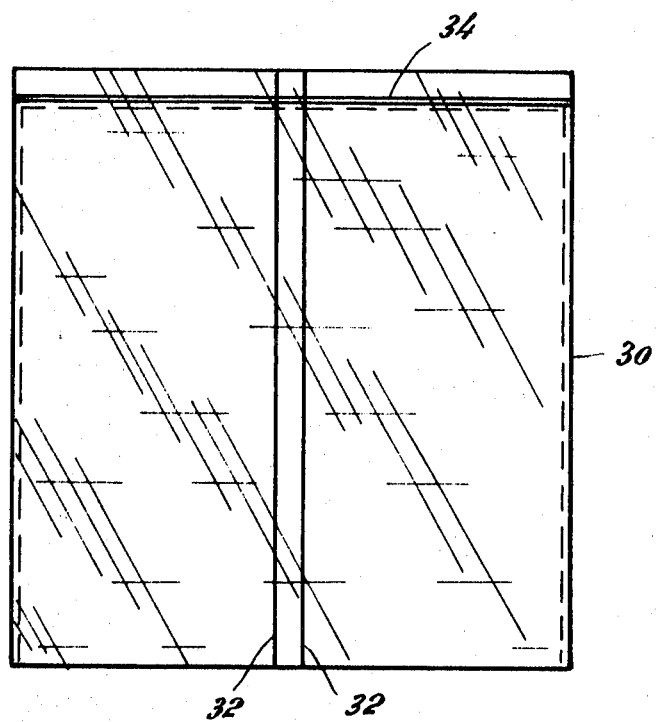

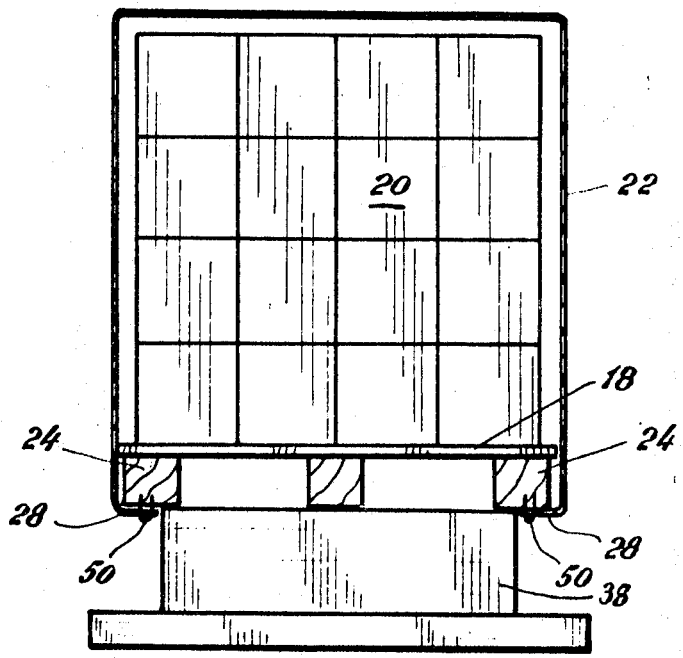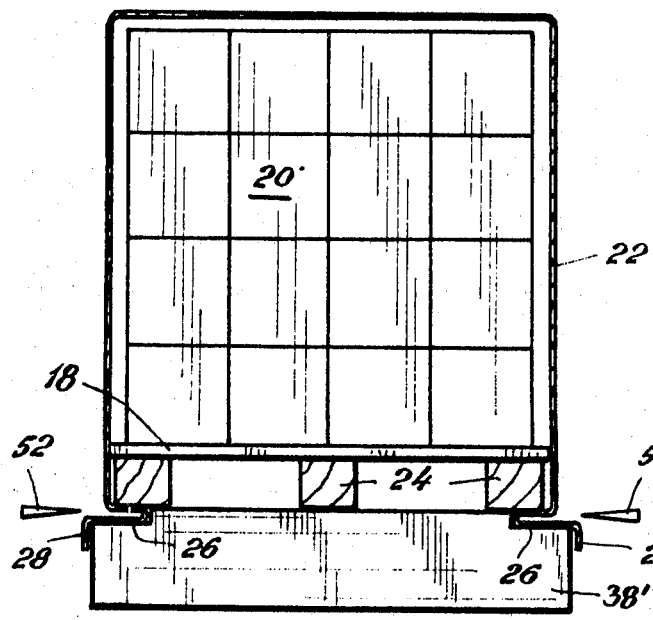

United States Patent Office 3,522,688
Patented Aug. 4, 1970

3,522,688
METHOD OF ENVELOPING A LOADED PALLET IN A CONFORMING PLASTIC FILM
Karl Kaliwoda, Munich, Walter Schuran, Graefelfing, and Heinrich Everhartz, Munich, Germany, assignors to Alkor-Oberlikon Plastic G.m.b.H., Munich, Germany
Filed Oct. 18, 1967, Ser. No. 676,216
Claims priority, application Germany, Oct. 19, 1966,
A 53,827
Int. Cl. B67b 43/02
U.S. Cl. 53—30          10 Claims

ABSTRACT OF THE DISCLOSURE

A method of shrink-wrapping a loaded pallet in a plastic film, in which a bag of shrinkable plastic film is pulled over the load and the pallet until the rim about the open bottom end of the bag projects beyond a downwardly directed exposed face on the pallet. When the bag is thereafter exposed to adequate heat while upward movement of its rim is restrained, the shrinking bag conformingly envelops the loaded pallet and is anchored by engagement with the downwardly directed face of the pallet.

BACKGROUND OF THE INVENTION

This invention relates to the handling of goods stored on a supporting pallet, and particularly to a method of enveloping the goods and at least a portion of the pallet in a substantially conforming plastic film.

It is common practice to store and otherwise handle stacks of goods while supported on pallets. When the pallets are to be kept outdoors or are otherwise surrounded by an atmosphere which may damage the stacked material, plastic covers have been employed heretofore for protecting the stored goods.

It is also known to protect stored goods by enclosing the goods in loosely fitting bags of heat-shrinkable plastic film, which is a staple article of commerce, and then to expose the bags to heat sufficient to cause shrinkage of the bags into conforming engagement with the goods. This method has been employed heretofore for securing several stored objects in a fixed spatial relationship by a common envelope of shrunken film.

It is an important object of the invention to make the benefits of shrink-wrapping in plastic film available for the protection and handling of goods loosely stacked on a pallet.

SUMMARY OF THE INVENTION

In one of its more specific aspects, the invention resides in a method of enveloping the goods supported on an upwardly directed face of a pallet and at least a portion of the pallet in a plastic film substantially conforming to the goods and to the pallet while the pallet is supported on a base. An air gap is provided to extend downwardly from a downwardly directed face of the pallet. A bag of heat shrinkable plastic film having an open bottom end and a rim portion about the opening in the bottom end is pulled downward over the goods and the pallet until the rim portion projects beyond the downwardly directed face. When the bag thereafter is exposed to heat sufficient to cause the same to shrink into conforming engagement with the goods and with the pallet, while upward movement of the rim portion is restrained, the shrunken film anchors the goods to the pallet because the rim portion envelopes the downwardly directed face of the pallet, and thereby locks the vertical shrinking stresses in the film.

Other features, additional objects, and many of the attendant advantages of this invention will readily become apparent from the following detailed description of preferred embodiments when considered in conjunction with the appended drawing.

BRIEF DESCRIPTION OF THE DRAWING

In the drawing:
FIG. 1 is a perspective view of goods stacked on a pallet and loosely enveloped by a cover of heat-shrinkable plastic film;
FIG. 2 shows the arrangement of FIG. 1 after shrinking of the cover;
FIG. 3 shows the cover in flattened condition prior to its application to the goods and the pallet of FIG. 1;
FIG. 6 shows a pallet with goods and a releasably attached, heat-shrinkable plastic film cover in partly sectional front elevation;
and
FIG. 7 illustrates a modification of the arrangement of FIG. 6 in an analogous view.

DESCRIPTION OF THE PREFERRED EMBODIMENTS

Figure 5:
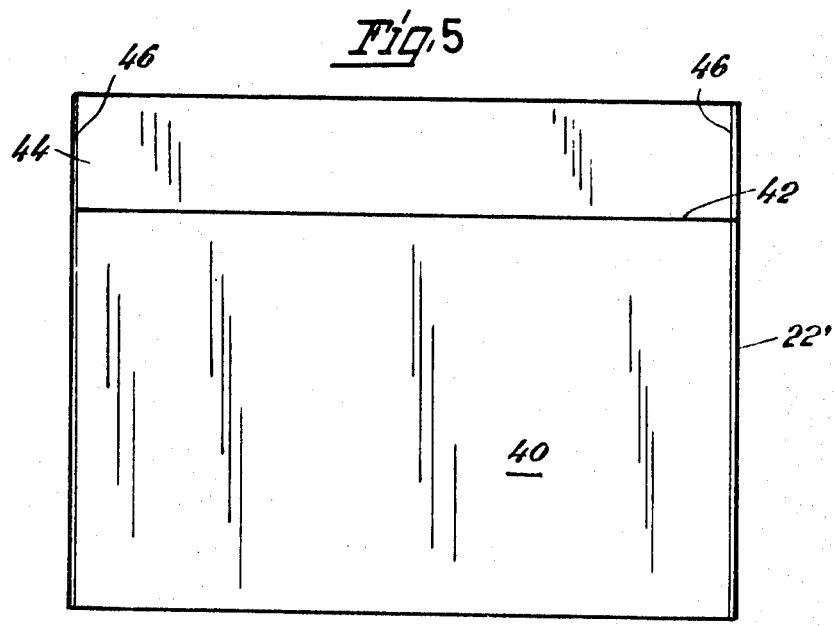
FIG. 5 shows the cover of FIG. 4 in flattened condition prior to heat shrinking.

Referring initially to FIGS. 1 to 3, there is seen the load-supporting platform of a conventional pallet 18 held above a supporting floor by means of legs more fully described hereinafter with reference to FIGS. 6 and 7. The platform carries a stack 20 of goods in rectangular boxes, and the pallet and boxes are loosely enveloped by a downwardly open cover 22 of heat-shrinkable polyolefin film.

As is evident from joint consideration of FIGS. 1 and 3, the cover 22 is made from a section 30 of tubular, extruded film by folding the members of two diametrically opposite pairs of integral flap portions 32 of the film toward each other about crease lines parallel to the direction of extrusion, and thereafter heat sealing or welding an axially terminal part of the section including the corresponding parts of the folded flap portions 32. When the tube assumes a rectangular cross section by being pulled over the stack 20, two axial walls are formed by the folded material including the flap portion 32, and the two other axial walls are connected by the welded seam 34 extending across the closed top between the pairs of folded flap portions 32. The top of the cover 22 partly consists of three thicknesses of folded material in two triangular areas indicated by hatching in FIG. 1. The length of the welded seam 34 is greater than the corresponding dimension of the stack 20.

The height of the cover is such that the rim portions 28 about the open end of the cover project downward beyond the downwardly directed, exposed edge faces of the pallet platform. The shape of the cover 22, when initially placed over the stack 20, is maintained by the relatively stiff welded seams 34 and the triangular multiple film layers.

When the covered stack and pallet are exposed to hot air or to the radiant heat of infrared lamps, the cover 22 shrinks into the shape illustrated in FIG. 2. The edge of the pallet 18 projects beyond the stack 20 in all horizontal directions. It is therefore gripped by the film of the cover 22 in an early stage of the shrinking process, and upward movement of the rim portion 28 under the vertical tension developing in the shrinking cover is prevented or held to a minimum. The vertical tension causes the ends 36 of the seam 34 to be drawn down over the sides of the stack 20, whereby the remainder of the seam 34 is folded flat against the top of the covered stack.

Figure 4:
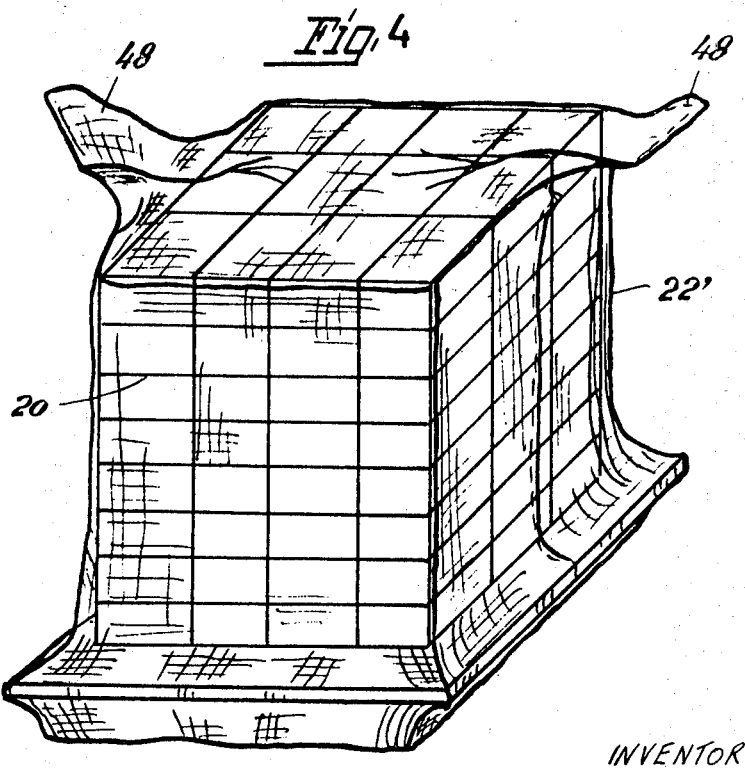
FIG. 4 shows goods on a pallet enclosed in a modified cover of heat-shrunk plastic film in a perspective view.

The shrunk cover 22' illustrated in FIG. 4 is made from a section 40 of flattened, tubular polyolefin film as shown in FIG. 5 by closing one axial end of the tube by a transverse welded seam 42, folding the sealed, axially terminal part 44 about a transverse axis over the main portion of the film section, and securing the folded part by welds or heat seals along its axial edges 46.

When the flat rectangular bag so formed is pulled over a stack of goods arranged on a pallet as described with reference to FIG. 1, it loosely envelops the side and top walls of the stack and extends downward beyond the pallet. Ears or pockets 48 of the plastic bag project from two opposite top edges of the stack. When exposed to heat, the shrinkable plastic film contracts to seal the stack 20 and the pallet in an envelope whose bottom is formed by the pallet.

The simple wrapping method illustrated in FIGS. 1 to 5 is limited in its application to films having relatively small shrinkage in the direction of extrusion, which is vertical in the two embodiments described, or to arrangements in which the edge of the pallet or other portions of the material to be covered engage the shrinking cover with sufficient frictional force to prevent the cover from pulling vertically away from the pallet platform.

The modified embodiments of the invention illustrated in FIGS. 6 and 7 are not so limited, and the arrangements illustrated may be employed with pallets whose feet 24 horizontally project beyond the pallet platform 16 in a manner not explicitly shown in FIGS. 6 and 7 which illustrate the same pallet as seen in FIGS. 1 to 5. The feet 24 are spacedly mounted on the underside of the pallet platform 16 to permit the pallet and the stack of goods 20 carried thereon to be lifted by a fork lift from a base 38 in the usual manner. The covers 22 are not shown in detail in FIGS. 6 and 7. They may be identical with any one of those illustrated in FIGS. 1 to 5.

The legs 24 partly overhang the edge of the base 38, and the rim portion 28 of the cover 22 shown in FIG. 6 prior to heat shrinking is releasably clamped to the exposed undersides of the legs 24 by means of U-shaped staples 50. The staples restrict vertically upward movement of the rim portion 28 during the heat shrinking process regardless of the configuration of the pallet and stack, and permit the use of shrinkable film without limiting the magnitude and direction of its shrinkage.

In the modified arrangement illustrated in FIG. 7, a downward step 26 is provided along the edges of the base 38' in such a manner that the underside of the legs 24 and the steps 26 define horizontally, air-filled, narrow slots. After the cover 22 has been pulled over the stack 20, its rim portion 28 is tucked into the slot and is secured in the slot by wedges 52 during heat shrinking. The wedges 52 as well as the staples 50 illustrated in FIG. 6 may be removed after heat shrinking in a very simple manner, and usually without the use of tools so that a limited number of staples 50 or wedges 52 may be employed for wrapping of a practically unlimited number of stacks and pallets.

The following example further illustrates the method of the invention substantially as illustrated in FIG. 7, and it will be understood that the invention is not limited thereto.

EXAMPLE

A pallet having a rectangular platform 120 cm. long and 100 cm. wide, and provided with legs of cubical shape, 10 cm, high, at its four corners was placed on a concrete base dimensioned in such a manner that the legs projected 5 cm. over a step on the base to form a slot 3 cm. high. The platform was covered to its very edge by rectangular boxes which formed a stack having the shape of a rectangular parallelepiped and a height of 180 cm.

A plastic film cover of the type shown in FIGS. 1 to 3 was pulled over the stack and the pallet. The initial circumferential dimension of the cover was 460 cm. and the folds were 52.5 cm. deep. The initial length of the cover was 260 cm. as measured from the transverse weld at one end to the open other end. The rim portion about the open end of the cover at first projected 15 cm. downward beyond the bottom of the pallet feet. It was tucked into the slots beteen the pallet feet and the base, and temporarily secured therein by wedges.

The cover consisted of a commercially available type of polyolefin, mainly polyethylene, having an initial thickness of 0.150 mm., and capable of linear shinkage of 30% in the direction of extrusion and transversely thereto when exposed to hot air at 200° C. for 30 seconds without restraint.

The covered pallet while supported on the base was exposed to a stream of air having a temperature of 200° C. for 30 seconds, a period too short to produce a significant thermal effect on the pallet, the boxes, or their content. The cover was shrunk tightly about the top and sides of the stack, the pallet platform and its feet. The rim portion was shrunk sufficiently under the downwardly directed corner faces of the pallet feet to prevent the cover from being removed without breaking the shrunken film.

The vertical length of the rim portion projecting beyond the downwardly directed face of the pallet platform prior to shrinking is only a small fraction of the unrestrained vertical shrinkage of the cover under the conditions of heat shrinkage. Vertical displacement of the rim portion, however, is initially restrained by the wedges, and after initial shirinkage, by the conforming engagement of the rim portion with the downwardly directed faces of the pallet feet. The air gap between these feet and the stepped top surface of the base, however, is sufficiently wide to permit the wedges to be dispensed with if hot air is effectively directed into the gap to cause circumferential shrinkage of the rim portion before the same can be pulled out of the gap by the vertical tension of the film.

It will be obvious, therefore, that means other than wedges or staples may be employed for restraining upward movement of the rim portion of the cover beyond an exposed downwardly directed face of the pallet. Other substitutions of equivalents will readily suggest themselves to those skilled in the art in the method of this invention. While the invention has been described as practiced with a heat-shrinking film mainly consisting of polyethylene, other plastic films are well known to have the ability of shrinking when exposed to moderate heat, and such other plastics may be used instead of polyethylene which is preferred at this time because of its low cost.

Best results are obtained with all types of plastic films having shrinking properties which cause the film to shrink substantially isotropically by 20% to 50% when exposed to the chosen conditions of heat shrinkage without being restrained. A linear, unrestrained shrinkage value of 25 to 35 percent provides a most desirable combination of resilient stresses in the film to hold the goods as well as the film to the pallet.

It should be understood, therefore, that the foregoing disclosure relates only to preferred embodiments of the invention, and that it is intended to cover all changes and modifications of the examples of the invention herein chosen for the purpose of the disclosure which do not depart from the spirit and scope of the appended claims.

What is claimed is:

1. A method of enveloping at least a portion of a pallet and goods supported on an upwardly directed face of the pallet in a plastic film substantially conforming to said goods and to said pallet while said pallet is supported on a base, which method comprises:
   (a) providing an air gap extending downwardly from a downwardly directed face of said pallet;
   (b) pulling a bag of substantially isotropically heat shrinkable plastic film having an open bottom end and a rim portion about the opening in said bottom end downward over said goods and said pallet until said rim portion projects downward beyond said downwardly directed face; and (c) exposing said bag to heat sufficient to cause the same to shrink into conforming engagement with said goods and with said pallet while restraining upward movement of said rim portion, whereby said rim portion when shrunk envelops said downwardly directed face.

2. A method as set forth in claim 1, wherein said heat is sufficient to cause displacement of said rim portion upward beyond said downwardly directed face if said movement of the rim portion is not restricted while the bag is exposed to said heat.

3. A method as set forth in claim 2, wherein said rim portion is clamped to said pallet for restraining said upward movement thereof.

4. A method as set forth in claim 3, wherein said rim portion is clamped to said downwardly directed face.

5. A method as set forth in claim 2, wherein said air gap is a horizontally open slot between said pallet and said base, and said rim portion is tucked into said slot to restrain said upward movement of the same.

6. A method as set forth in claim 5, wherein a wedge is inserted into said slot for fastening the tucked rim portion to said downwardly directed face.

7. A method as set forth in claim 1, wherein said bag is formed from an open tube of said plastic film by folding the members of two diametrically opposite pairs of portions of said tube toward each other about respective crease lines extending between the open ends of the tube, and sealing one of the open ends of the tube, and thereby securing the folds so produced.

8. A method as set forth in claim 1, wherein said bag is formed from an open tube of said plastic film by sealing one of the open ends of said tube, folding the sealed terminal part over the remainder of said tube, and securing said terminal part to said remainder in the folded condition.

9. A method as set forth in claim 1, wherein said plastic film, when exposed to said heat without being restrained, shrinks linearily and substantially isotropically by 20 to 50 percent.

10. A method as set forth in claim 1, wherein said plastic film shrinks linearily and substantially isotropically by 25 to 35 percent when exposed to said heat without being restrained.

References Cited

UNITED STATES PATENTS

| 3,050,402 | 8/1962 | Dreyfus et al. | |
| 3,429,095 | 2/1969 | Huson | 53—24 |

FOREIGN PATENTS 1,467,274  12/1966  France.

THERON E. CONDON, Primary Examiner

E. F. DESMOND, Assistant Examiner

U.S. Cl. X.R.

206—65